(12) United States Patent
Kano et al.

(10) Patent No.: US 7,145,325 B2
(45) Date of Patent: Dec. 5, 2006

(54) DISPLACEMENT DETECTION APPARATUS AND DISPLACEMENT DETECTION METHOD

(75) Inventors: Mitsunari Kano, Seto (JP); Akira Mori, Owariasahi (JP); Itsuki Hayashi, Kasugai (JP); Muneharu Nakabayashi, Toyohashi (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 0 days.

(21) Appl. No.: 11/127,311

(22) Filed: May 12, 2005

(65) Prior Publication Data
US 2005/0258826 A1 Nov. 24, 2005

(30) Foreign Application Priority Data
May 20, 2004 (JP) .............................. 2004-150065

(51) Int. Cl.
*G01B 7/14* (2006.01)
(52) U.S. Cl. ........................... 324/207.16; 324/207.26; 324/229
(58) Field of Classification Search .................... None
See application file for complete search history.

(56) References Cited

U.S. PATENT DOCUMENTS 4,851,770 A 7/1989 Fiori, Jr.
5,079,502 A * 1/1992 Rogacki et al. ........ 324/207.19
6,208,135 B1 * 3/2001 Shattil ........................ 324/225

FOREIGN PATENT DOCUMENTS

| EP | 0 169 633 A2 | 1/1986 |
|---|---|---|
| GB | 2 394 295 A | 4/2004 |
| JP | 56-107118 | 8/1981 |
| JP | 09-101106 | 4/1997 |
| JP | 11-030622 A | 2/1999 |
| JP | 2001-281125 A | 10/2001 |
| JP | 2003-298403 A | 10/2003 |

* cited by examiner

*Primary Examiner*—Jay M. Patidar
(74) *Attorney, Agent, or Firm*—McDermott Will & Emery LLP

(57) ABSTRACT

Improving reducing or eliminating the effects of variation in characteristics of the resonance circuit in a resonance type displacement detection apparatus, so as to improve displacement detection accuracy. In a displacement detection system 10, the resonance frequency range assumable by the resonance circuit 21 is estimated in advance, there is determined a drive frequency variation range f1–f2 such that the estimated resonance frequency range is included therein, and by means of a variable oscillator 30, drive frequency is repeatedly varied between the first frequency f1 and the second frequency f2. Accordingly, where the resonance frequency of the resonance circuit 21 is fr1, when the drive frequency has changed to fr1, resonance voltage Vgl1 may be obtained in the case of large gap G. Where the resonance frequency of the resonance circuit 21 is fr2, when the drive frequency has changed to fr2, resonance voltage Vgl2 may be obtained in the case of large gap G.

11 Claims, 6 Drawing Sheets

DISPLACEMENT DETECTION APPARATUS AND DISPLACEMENT DETECTION METHOD

This application claims the benefit of priority of Japanese Patent Application No. 2004-150065 filed on May 20, 2004, the disclosure of which is also entirely incorporated herein by reference.

BACKGROUND OF THE INVENTION

The present invention relates to a displacement detection apparatus and a displacement detection method for detecting displacement of a detection target.

Displacement detection sensors known in the art as sensors for detecting displacement of a detection target include displacement detection sensors of self-oscillating type and displacement detection sensors of resonance type, which detect change in distance from the target in the form of changes in oscillation intensity and oscillation frequency originating in eddy current produced in the target. A displacement detection sensor of self-oscillating type produces oscillation by means of an inductor, directs the magnetic flux output by the inductor against the target, and detects change in distance from the target from changes in oscillation intensity and oscillation frequency. Accordingly, when several self-oscillating displacement detection sensors are situated adjacently, oscillation conditions may be affected by flux output by other adjacently situated self-oscillating displacement detection sensors, resulting in inability to accurately sense changes in oscillation intensity. In order to prevent this, interposition of magnetic shielding has been contemplated, but this is associated with higher costs, and it is difficult to achieve complete shielding.

A displacement detection sensor of resonance type, on the other hand, obtains by means of a crystal oscillator or other such external oscillator a frequency to be superimposed on a drive voltage, and drives a resonance circuit. In this case, since the oscillation frequency produced by the external oscillators is the same, even when magnetic flux is output from individual inductors, the effects on adjacent circuits is lessened. Relevant publications include Unexamined Patent Application 2003-298403 and Unexamined Patent Application 9-101106.

SUMMARY OF THE INVENTION

A problem with resonance displacement detection sensors, however, is that resonance frequency varies with variation in the capacity of the inductor and capacitor that make up the resonance circuit of each sensor. Specifically, inductors experience alternation of inductance due to variation in winding shape and temperature fluctuations, and capacitor experience change over time and temperature variation, resulting in fluctuation in the product of inductance and capacitor capacity, so that resonance frequency varies. As a result, due to the variation in resonance frequency, there is a risk that amplitude intensity (output voltage) will drop, so that displacement of the target cannot be detected accurately.

In order to address this problem, there is need to reduce or eliminate the effects of variation in characteristics of the resonance circuit in a resonance displacement detection sensor, and improve displacement detection accuracy.

To address the problem, the invention provides a displacement detection system for detecting a detection target. The displacement detection system of the invention comprises a resonance circuit that has a sensor coil facing the detection target and that outputs oscillating voltage corresponding to a particular oscillation frequency, a variable frequency oscillation circuit whose oscillation frequency is variable repeatedly between a first frequency and a second frequency; a drive circuit that superimposes the frequency generated by the variable frequency oscillation circuit onto drive voltage which is applied to the resonance circuit, and a displacement sensor that using the resonance voltage output by the resonance circuit detects displacement of the detection target. In accordance with the invention, the effect of variation in characteristics of the resonance circuit may be reduced or eliminated, so that displacement detection accuracy may be improved.

Other aspects and advantages of the present invention will become apparent from the following detailed description, taken in conjunction with the accompanying drawings, illustrating by way of example the principles of the present invention.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE EMBODIMENTS

Following is a description of a displacement detection apparatus and a displacement detection method based on embodiments, making reference to the accompanying drawings.

Figure 1:
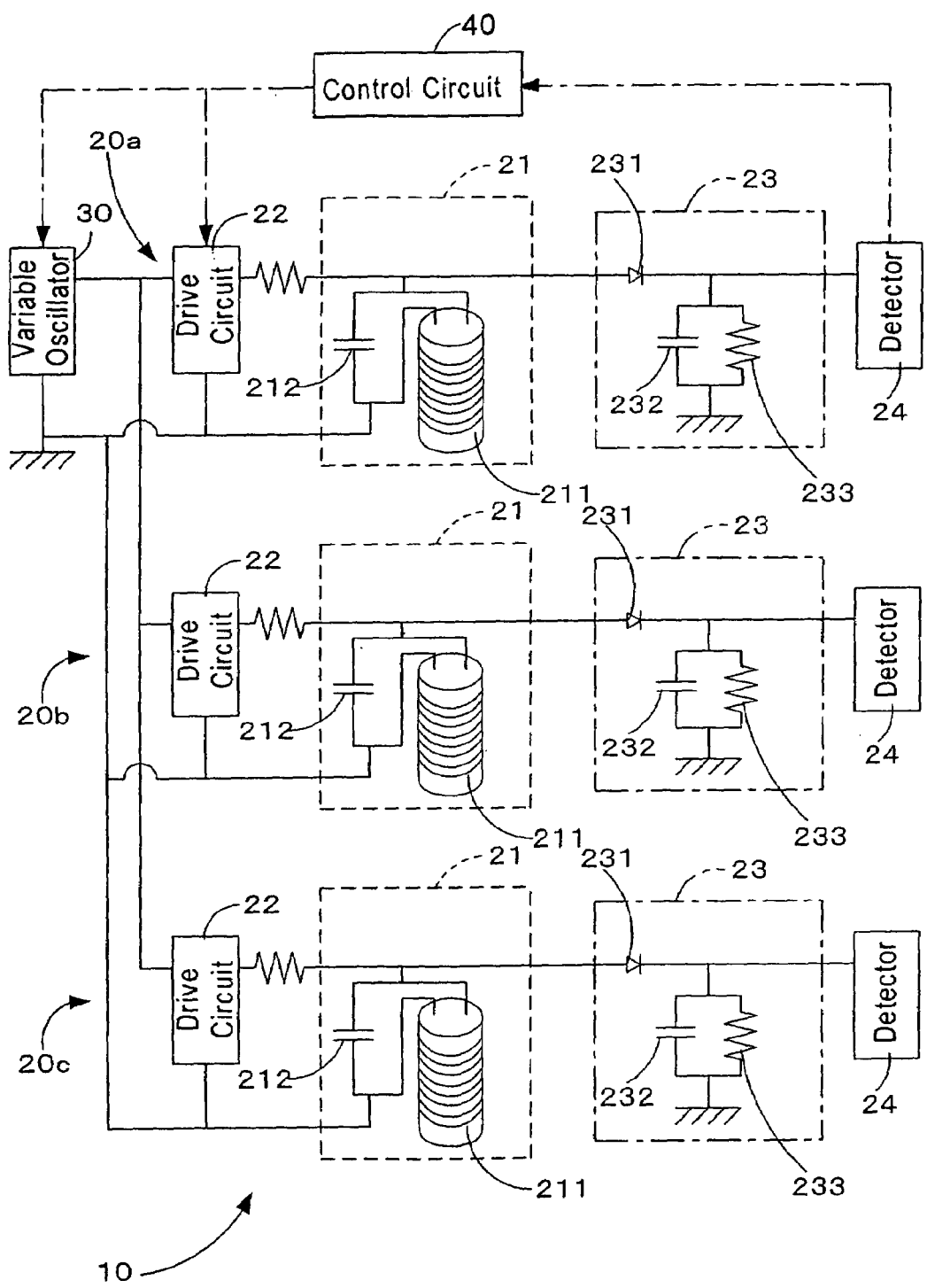
FIG. 1 is an illustration depicting a configuration example of a displacement detection system comprising a plurality of displacement detection apparatus.
Figure 2:
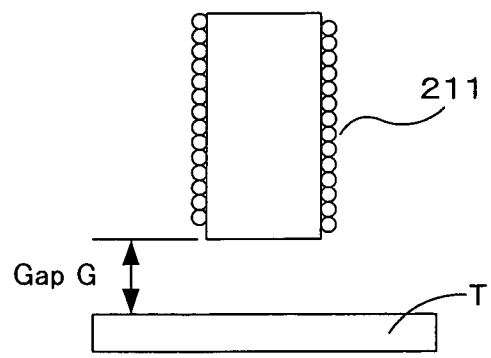
FIG. 2 is an illustration depicting an exemplary positional relationship of the coil making up a displacement detection apparatus, and a displacement detection target.
Figure 3:
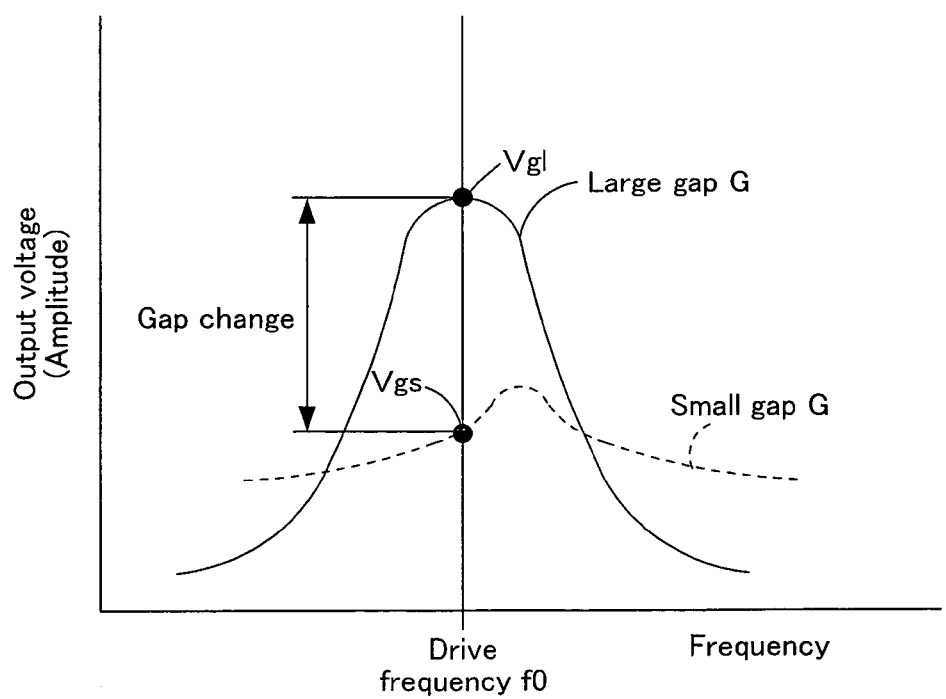
FIG. 3 is an illustration depicting the method for detecting displacement of a displacement detection target by a displacement detection apparatus.

The following description of the general arrangement of a displacement detection system comprising a plurality of displacement detection apparatus pertaining to an embodiment of the invention makes reference to FIGS. 1–3. FIG. 1 is an illustration depicting a configuration example of a displacement detection system comprising a plurality of displacement detection apparatus. FIG. 2 is an illustration depicting an exemplary positional relationship of the coil making up a displacement detection apparatus, and a displacement detection target. FIG. 3 is an illustration depicting the method for detecting displacement of a displacement detection target by a displacement detection apparatus.

The displacement detection system 10 depicted in FIG. 1 comprises three displacement detection apparatus 20a, 20b, 20c. The displacement detection system 10 may instead comprise two, or four or more, displacement detection apparatus 20. A shared variable oscillator 30 is connected to each of the displacement detection apparatus 20a, 20b, 20c. The variable oscillator 30 is, for example, a variable frequency type oscillator whose oscillation frequency (drive frequency) is variable repeatedly within a predetermined range, i.e. between a first frequency and a second frequency; e.g. a voltage controlled oscillator (VCO) or digital counter IC may be used. The oscillation frequency of the variable oscillator 30 is several MHz, for example, and the repetition cycle is several hundred µs. In preferred practice, the first frequency and second frequency will be determined by estimating the resonance frequency range that the displacement detection apparatus 20 (specifically the resonance circuit 21, described later) may assume, and including this estimated resonance frequency range between them.

Each displacement detection apparatus 20a, 20b, 20c comprises a resonance circuit 21, a drive circuit 22 that applies drive voltage to the resonance circuit 21, a wave detector 23 that detects peak voltage of amplitude (resonance voltage) output by the resonance circuit 21, and a detector 24 that detects displacement of the displacement detection target on the basis of displacement of the peak value of resonance voltage output by the wave detector 23. The wave detector 23 and sensor 24 constitute a displacement detector.

The variable oscillator 30 and the drive circuit 22 and detector 24 of each of the displacement detection apparatus 20a, 20b, 20c are connected to a control circuit 40 that controls the displacement detection system 10. The control circuit 40 comprises a CPU, memory, and an input/output unit. The control circuit 40 executes the processes of instruction of oscillation frequency by the variable oscillator 30, reporting based on detection of displacement of the displacement detection target T on the basis of the output voltage of resonance circuit 21 detected by the detector 24, discrimination of displacement detection targets displacement of which has been detected, and so on.

The resonance circuit 21 is composed of a parallel circuit LC comprising a coil 211 and a capacitor 212. The coil 211 functions as a displacement detection unit; as shown in FIG. 2, it is disposed in opposition to the displacement detection target T, spaced apart from it by a predetermined gap G. In the displacement detection apparatus 20a, 20b, 20c pertaining to this embodiment, displacement of the displacement detection target T, e.g. change in thickness, is detected through the agency of change in the gap G.

The wave detector 23 comprises a diode 231, a hold capacitor 232, and discharge resistance 233. The hold capacitor 232 and discharge resistance 233 are connected in parallel, with the two elements 231, 233 connected at one end to the resonance circuit 21 and detector 24, and the other end grounded. The discharge resistance 233 has a resistance value established such that, for example, the charge held by the hold capacitor 232 is consumed in the course of a single cycle of the repeating frequency sweep cycle. The wave detector 23 may instead be realized using a sample/hold circuit and A/D conversion circuit. By means of the wave detector 23, of the voltage values (amplitude) output by the resonance circuit 21, the highest voltage value (peak value) is held by the hold capacitor 232. The charge held by the hold capacitor 232 is consumed via the discharge resistance 233, in the course of a single cycle of the repeated frequency sweep cycle. By means of this repeating cycle, the peak value of output voltage is detected during each frequency cycle (each sweep).

The detector 24 detects displacement of the displacement detection target based on fluctuation of the output voltage detected by the wave detector 23. The following description of the specific method for doing so refers to FIG. 3. FIG. 3 is depicts in model form change in output voltage (amplitude) with respect to drive frequency, where the resonance frequency of the resonance circuit 21 is drive frequency f0. When drive voltage having resonance frequency f0 superimposed thereon is applied to the resonance circuit 21, where there is a large gap G between the coil 211 (which functions as the displacement detection unit) and the displacement detection target T, resonance voltage (output voltage peak value) Vgl associated with a large gap G is obtained. On the other hand, as the displacement detection target T increases in thickness so that the gap G between the coil 211 and the displacement detection target T becomes smaller, there is a change in the parameter corresponding to the Q value of the resonance circuit 21 due to eddy current produced by the displacement detection target T, the resonance frequency rises, and the resonance voltage drops. As a result, resonance voltage Vgs associated with a small gap G is obtained at a given drive frequency f0.

Accordingly, by detecting the difference between resonance voltage Vgl and resonance voltage Vgs (i.e. the gap change) at drive frequency f0, displacement of the displacement detection target T may be detected. When displacement of the displacement detection target T is detected, a displacement detection signal is sent to the control circuit 40 by the detector 24, whereupon the control circuit 40, for example, records it as history in nonvolatile memory, or instructs the displacement detection target T conveyor mechanism so that the displacement detection target T for which displacement has been detected is stored apart from other displacement detection targets T.

Figure 4:
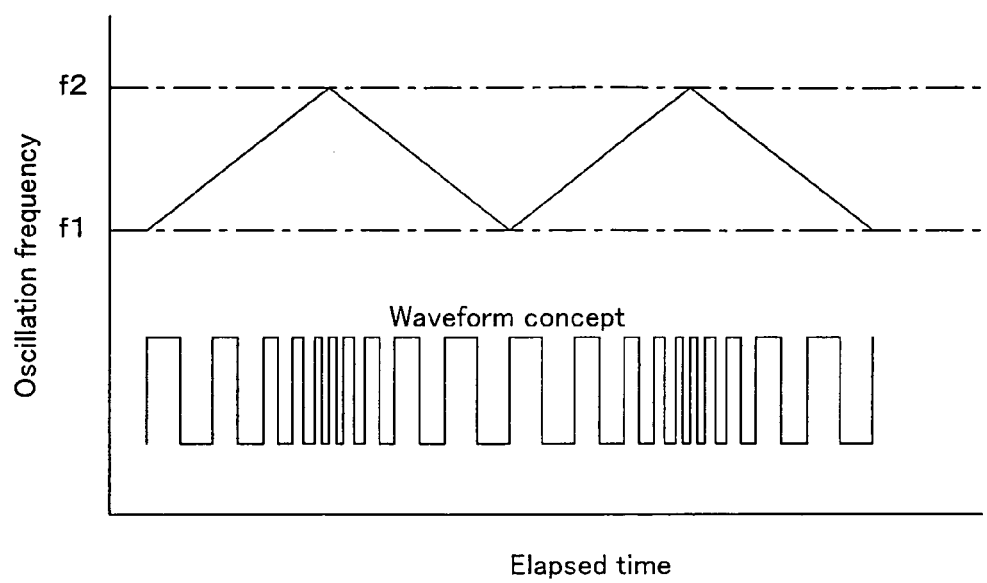
FIG. 4 is an illustration depicting change in frequency output continuously by the variable oscillator.
Figure 5:
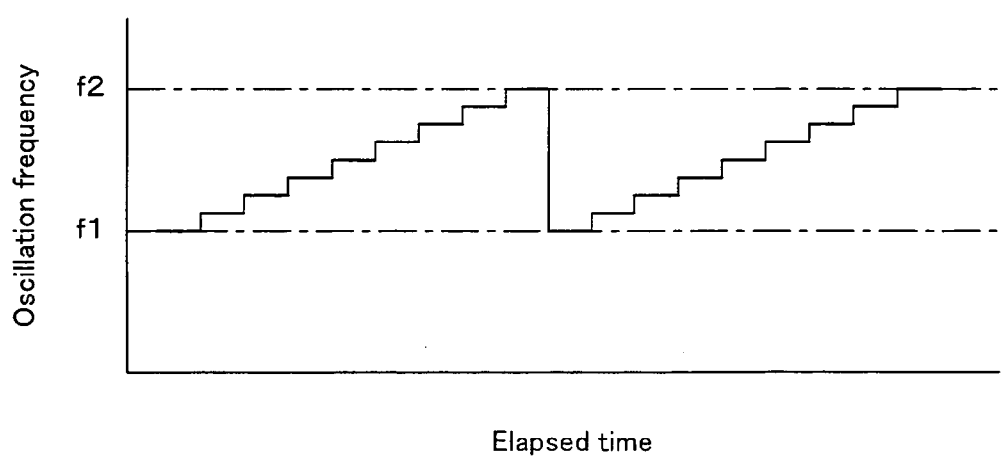
FIG. 5 is an illustration depicting change in frequency output discretely by the variable oscillator.
Figure 6:
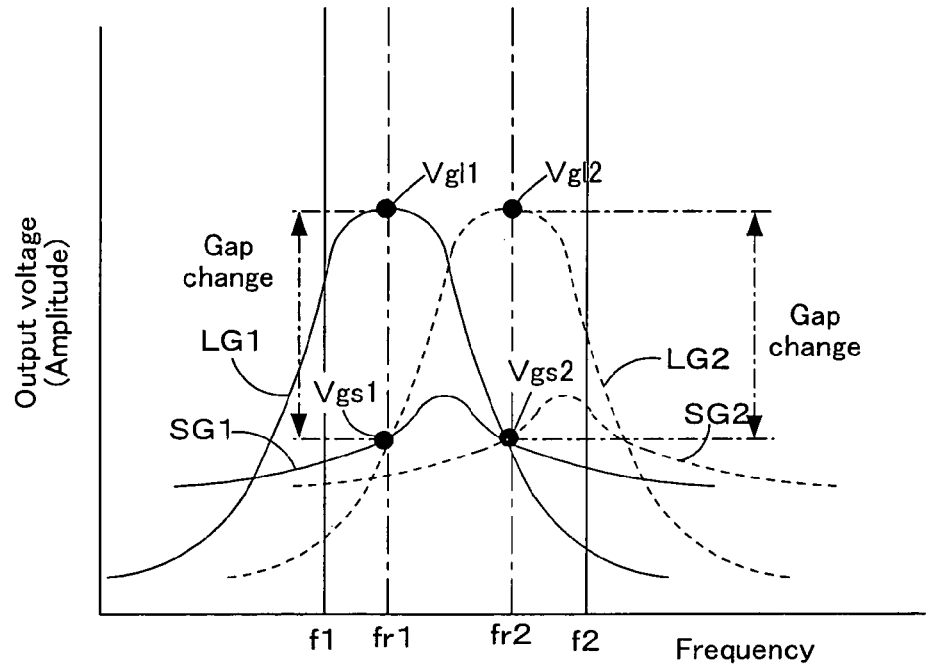
FIG. 6 is an illustration depicting an example of resonance voltage obtained from displacement detection apparatus.
Figure 7:
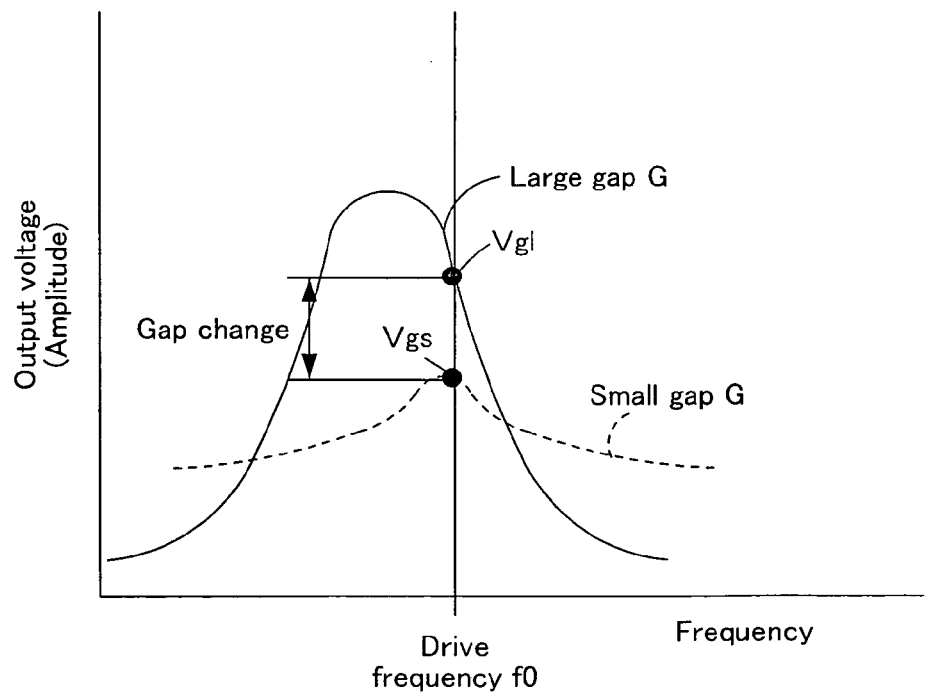
FIG. 7 is an illustration depicting an example of resonance voltage obtained from a particular displacement detection apparatus.

Operation of the displacement detection apparatus 20a, 20b, 20c pertaining to the embodiment will now be described with reference to FIGS. 4–7. FIG. 4 is an illustration depicting change in frequency output continuously by the variable oscillator in the embodiment. FIG. 5 is an illustration depicting change in frequency output discretely by the variable oscillator in the embodiment. FIG. 6 is an illustration depicting an example of resonance voltage obtained from the displacement detection apparatus in the embodiment. FIG. 7 is an illustration depicting an example of resonance voltage obtained from a particular displacement detection apparatus.

In accordance with the instructions of the control circuit 40, the variable oscillator 30 may repeatedly change oscillation frequency continuously with respect to the time axis as shown in FIG. 4, or may repeatedly change oscillation frequency discretely (stepwise) with respect to the time axis as shown in FIG. 5. In FIG. 4 and FIG. 5, the horizontal axis indicates elapsed time and the vertical axis represents oscillation frequency, respectively. In FIG. 4, there is also shown waveform concept where oscillation frequency is made to change continuously.

As noted previously, in resonance displacement detection sensors, by varying capacity of the inductor and capacitor making up the resonance circuit of each sensor, the resonance frequency varies among a plurality of drive frequencies, for example, fr1 and fr2. As a result, as shown in FIG. 6, the output voltage characteristics exhibited by the resonance 21 with respect to the drive frequency exhibit LG1 (large gap G), SG1 (small gap G) where the drive frequency is resonance frequency fr1, and LG2 (large gap G), SG2 (small gap G) where the drive frequency is resonance frequency fr2. Accordingly, where for example the drive frequency is fixed at predetermined frequency fr, it was not possible to detect resonance voltage (output voltage peak value) in the event that resonance frequency changed to resonance frequency fr1 or fr2.

That is, as shown in FIG. 7, in a particular resonance displacement detection apparatus, since resonance frequency and drive frequency do not coincide, the large gap G output voltage Vgl assumes a value smaller than the resonance voltage Vgl_peak. As a result, the voltage difference between the large gap G output voltage Vgl and the small gap G output voltage Vgs becomes smaller, so that change in the gap could not be detected with accuracy.

However, with the displacement detection system 10 pertaining to the embodiment, the frequency range that the resonance circuit 21 may assume is estimated in advance, there is determined a drive frequency variation range f1–f2 such that the estimated resonance frequency range is included therein, and the control circuit 40, by means of the variable oscillator 30, repeatedly varies the drive frequency between the first frequency f1 and the second frequency f2. Accordingly, as shown in FIG. 6, in the event that the resonance frequency of the resonance circuit 21 is fr1, the detector 24 may obtain resonance voltage Vgl1 in the case of large gap G as the peak value, when the drive frequency has changed to fr1. In the event that the resonance frequency of the resonance circuit 21 is fr2, the detector 24 may obtain resonance voltage Vgl2 in the case of large gap G as the peak value, when the drive frequency has changed to fr2.

On the other hand, when the displacement detection target T comes closer to the coil 211 (displaces), the detector 24 detects the small gap G resonance Vgs1 or Vgs2 as the peak value. The detector 24 calculates the difference between the large gap G peak value of output voltage (resonance voltage value) at the small gap G peak value of output voltage, and in the event that the difference is more than a predetermined value, detects that there has been displacement, i.e. change in thickness or change in transit location, of the displacement detection target T.

In the embodiment, since drive frequency changes cyclically between a first frequency and a second frequency, resonance voltage of a large peak value may be obtained as output voltage output by the resonance circuit 21 at a large gap G. Specifically, at resonance frequencies fr1, fr2, it is possible to obtain large gap G resonance voltages Vgl1 and Vgl2, with the voltage differentials between the large gap G resonance voltages Vgl1 and Vgl2 and the small gap G resonance voltages Vgs1 and Vgs2 being well-defined so that changes in the gap may be sharply distinguished with good accuracy. In other words, displacement of the displacement detection target T may be detected accurately. Since the drive frequency repeat cycle (sweep cycle) in the displacement detection apparatus 20 pertaining to the embodiment is several hundred μs long, displacement of displacement detection targets T may be detected sufficiently as the displacement detection targets T pass by.

Figure 8:
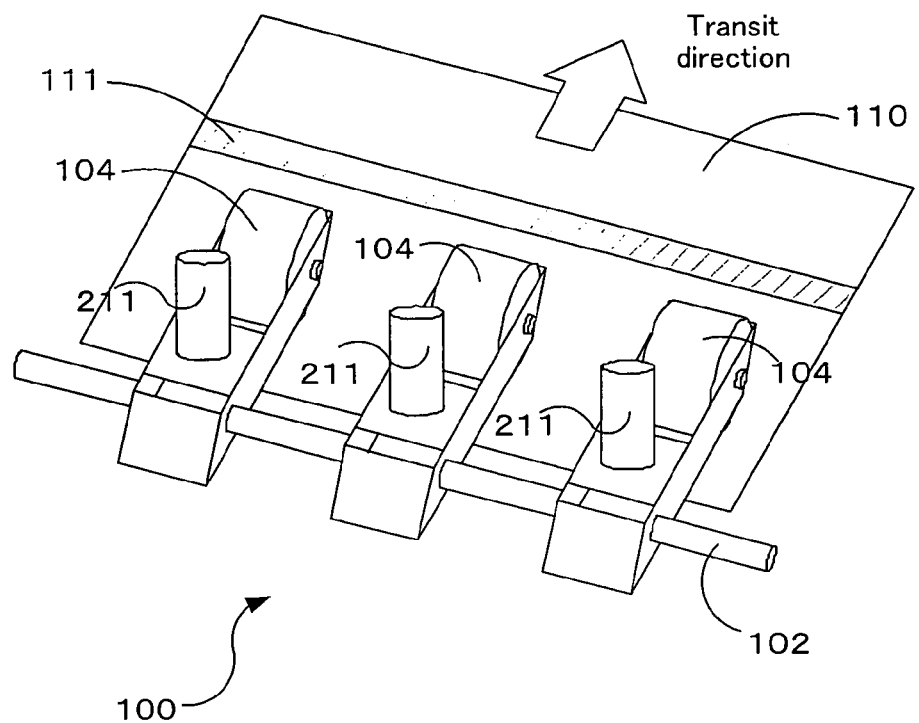
FIG. 8 is an illustration depicting in model form an application example of application of a displacement detection system having a plurality of adjacently positioned displacement detection apparatus, as a paper thickness detection mechanism.
Figure 9:
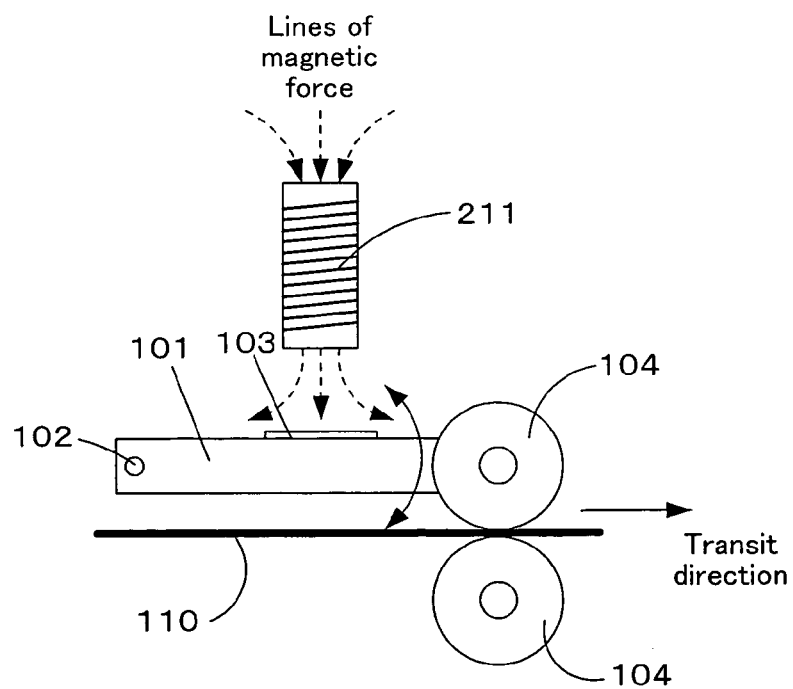
FIG. 9 is an illustration depicting in model form a gap G detection mechanism in the application example shown in FIG. 8.

An application example of the displacement detection system 10 pertaining to the embodiment will now be described with reference to FIG. 8 and FIG. 9. FIG. 8 is an illustration depicting in model form an application example of application of a displacement detection system 10 having a plurality of adjacently positioned displacement detection apparatus 20, as a paper thickness detection mechanism. FIG. 9 is an illustration depicting in model form a gap G detection mechanism in the application example shown in FIG. 8.

In the example of FIG. 8, there is employed a displacement detection system 10 equipped with three displacement detection apparatus 20; in order to simply the drawing, only the coil 211 of each displacement detection apparatus 20 is shown. To describe in detail with reference to FIG. 9, the paper thickness detection mechanism 100 comprises a plurality of arms 101, shafts 102, sensor targets 103 as displacement detection targets T, and rotating rollers 104. A first end of each arm 101 is swivelably supported by a shaft 102. At the other end of each arm are rotatably disposed the rotating rollers 104 for guiding the paper 110, placed so as to be in rolling contact with the front and back surfaces of the paper 110. The coil 211 of each displacement detection apparatus 20 is positioned above a sensor target 103, with a predetermined gap therebetween.

When the paper 110 passes through the rotating rollers 104, the arm 101 swivels about the shaft 102 in the direction indicated by the arrows in FIG. 9, depending on the thickness of the paper 110. By means of swiveling of the arm 101, the gap between the sensor target 103 and the coil 211 displaces, and change in the thickness of the paper 110 is detected. For example, as shown in FIG. 8, in the event that there is adhering material 111, e.g. tape, adhering to the paper 110, when the rotating rollers 104 pass over the area where the adhering material 111 adheres to the paper 110, the arm 101 undergoes generally upward displacement by an amount equivalent to the thickness of the adhering material 111. As a result, the gap between the sensor target 103 and the coil 211 displaces, and it is detected that adhering material 111 is adhering to the paper 110.

As described hereinabove, according to this embodiment, drive frequency fluctuates repeatedly between a first frequency and a second frequency established so as to include the resonance frequencies that may be assumed by the displacement detection apparatus 20 of the displacement detection system 10, whereby even if there is change in the capacity of the inductor and capacitor of a displacement detection apparatus, resonance voltage may be detected in the case of a large gap G.

Accordingly, change in resonance voltage resulting from the gap G becoming smaller due to the thickness of adhering material 111 adhering to the paper 110 may be detected accurately. That is, a sufficient large voltage difference may be created between resonance voltage where the gap G is large and resonance voltage where the gap G is small, so the drop in resonance voltage produced by the thickness of adhering material 111 adhering to the paper 110 may be detected accurately. As a result, detection accuracy of paper 110 with adhering material 111 adhering thereto may be improved. In the displacement detection system 10 pertaining to the embodiment, since the drive frequency repetition cycle (sweep cycle) is several hundred μs, adhering material 111 adhering to the paper 110 may be detected adequately as the paper 110 passes by.

Since the displacement detection system 10 pertaining to the embodiment comprises resonance type displacement detection apparatus 20a, 20b, 2c, the plurality of displacement detection apparatus 20 may be disposed in proximity to one another.

Figure 10:
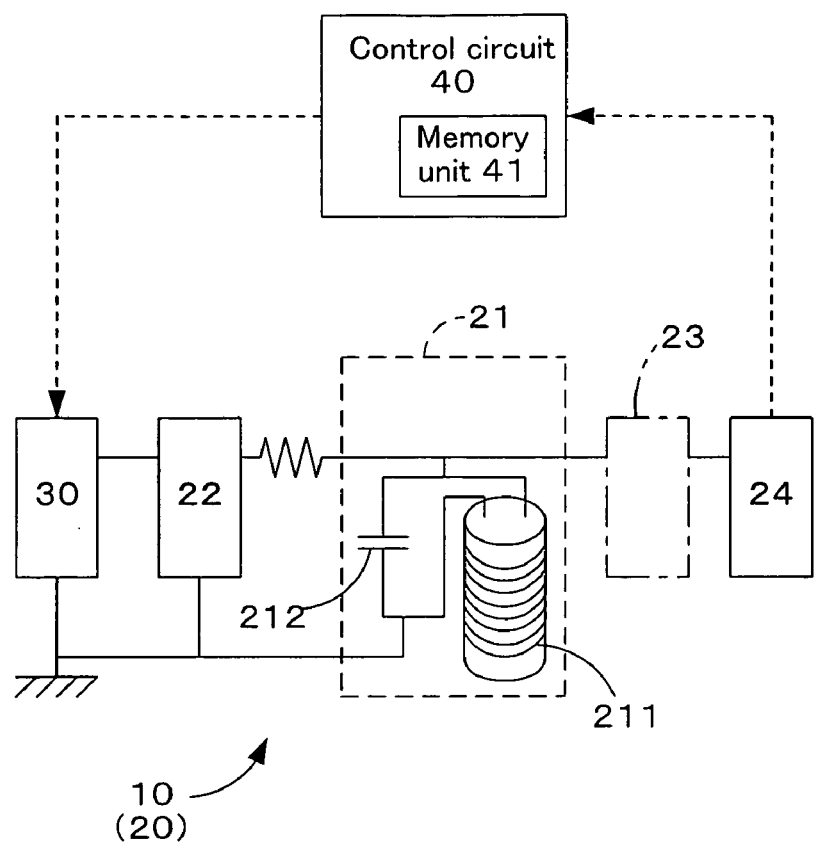
FIG. 10 is an illustration depicting in model form a configuration example of a displacement detection system (displacement detection apparatus) pertaining to another embodiment.

Other Embodiments:

(1) Whereas in the embodiment hereinabove, drive frequency is repeatedly changed between a first frequency and a second frequency by means of a variable oscillator 30, drive frequency could instead be changed from the first frequency to the second frequency only at predetermined timing. This could be realized by providing the arrangement depicted in FIG. 10, for example. FIG. 10 is an illustration depicting in model form a configuration example of a displacement detection system (displacement detection apparatus) pertaining to another embodiment. This displacement detection apparatus comprises a variable oscillator 30, and a memory unit 41 provided as memory in the control circuit 40 connected to the detector 24, enabling the detected resonance frequency of the resonance circuit 21 to be stored in memory in the memory unit 41. By using this stored resonance frequency as the drive frequency, the control circuit 40 detects displacement of a displacement detection target T.

Specifically, in an apparatus in which the displacement detection system 10 has been installed, e.g. a cash handling apparatus, at the timing for dispensing or depositing cash, or at predetermined time intervals, the control circuit 40 changes the drive frequency from a first frequency to a second frequency by means of the variable oscillator 30; detects by means of a detector 24 the frequency at which the output voltage of the resonance circuit 21 exhibits peak value (resonance voltage) i.e. the resonance frequency; and store this in the memory unit 41. Thereafter, until the timing of the next resonance frequency detection arrives, the control circuit 40, using the resonance frequency stored in the memory unit 41 as the drive frequency, applies drive voltage onto which the drive frequency in question has been superimposed to the resonance circuit 21 of the displacement detection apparatus 20, and detects displacement of a displacement detection target T.

By means of this displacement detection apparatus, when detecting displacement of a displacement detection target T, the resonance frequency detected immediately prior will always be used as the drive frequency, whereby it is possible to produce a large voltage differential between large gap G resonance voltage and small gap G resonance voltage, improving the detection accuracy of the displacement detection target T.

(2) Whereas in the embodiment herein, the displacement detection system 10 was described as having three displacement detection apparatus 20, but similar advantages may be obtained with a displacement detection system 10 having one, two, or four or more displacement detection apparatus 20.

While the displacement detection system 10, displacement detection apparatus 20, and displacement detection method of the invention have been described in terms of certain preferred embodiments, the embodiments herein are intended to aid in understanding the invention and should not be construed as limiting. Various modifications and improvements may be made to the invention without departing from the spirit thereof, and these equivalents shall be considered as falling within the scope of the invention as well.

What is claimed is:

1. A displacement detection system for detecting a detection target, the displacement detection system comprising:
a plurality of adjacently positioned displacement detection apparatus, wherein each of the plurality of displacement detection apparatus comprises:
a resonance circuit that has a sensor coil facing the detection target and that outputs oscillating voltage corresponding to a particular oscillation frequency;
a variable frequency oscillation circuit that generates oscillation frequency, wherein the oscillation frequency is variable between a first frequency and a second frequency repeatedly;
a drive circuit that superimposes the frequency generated by the variable frequency oscillation circuit onto drive voltage that is applied to the resonance circuit; and
a displacement sensor that detects displacement of the detection target by using the resonance voltage output from the resonance circuit.

2. A displacement detection system according to claim 1 wherein
the first frequency and the second frequency include at least the resonance frequency range that is available to the resonance circuit, and
the variable frequency oscillation circuit varies the frequency continuously between the first frequency and the second frequency.

3. A displacement detection system according to claim 1 wherein
the first frequency and the second frequency include at least the resonance frequency range that is available to the resonance circuit, and
the variable frequency oscillation circuit varies the frequency discretely between the first frequency and the second frequency.

4. A displacement detection system according to claim 1 wherein
the displacement detector, in the event that there is a large gap between the detection target and the detection coil, detects a first resonance voltage output by the resonance circuit; and in event that there is a small gap between the detection target and the detection coil, detects a second resonance voltage output by the resonance circuit.

5. A displacement detection system according to claim 4 wherein
the displacement detector, in the event that the difference between the detected first resonance voltage and second resonance voltage is greater than a predetermined value, detects that displacement of the detection target has occurred.

6. A displacement detection system according to claim 1 wherein
the displacement detector has a wave detector connected to the resonance circuit and grounded at the other end, and a detector that detects displacement of the displacement of the detection target on the basis of fluctuation in the output voltage value detected by the wave detector.

7. A displacement detection system according to claim 6 wherein
the wave detector has a hold capacitor and discharge resistance connected in parallel with the hold capacitor, and
the hold capacitor holds the highest peaks value of the voltage value, among the voltage values output by the resonance circuit.

8. A displacement detection system according to claim 1 further comprising a memory unit for storing resonance frequency detected from the resonance circuit;

wherein the displacement detector requests the variable oscillation circuit for frequency oscillation at the stored resonance frequency, the resonance frequency produced thereby is superimposed on drive voltage which is applied to the resonance circuit, and the resonance voltage output by the resonance circuit is used to detect displacement of the detection target.

9. A displacement detection system according to claim 1 further comprising rotating rollers for guiding paper and an arm supporting the rollers, wherein the detection coil is faces the arm which swivels by means of the rollers.

10. A method of detecting displacement of a detection target, the method comprising:

repeatedly changing the oscillation frequency between a first frequency and a second frequency;

superimposing the changed frequency onto the drive voltage for application to a resonance circuit that includes a detection coil facing the detection target; and detecting displacement of the detection target by using the resonance voltage corresponding to resonance frequency output from the resonance circuit.

11. A displacement detection method according to claim 10 wherein the resonance frequency detected from the resonance circuit is stored in a memory unit; and the stored resonance frequency is superimposed on the drive voltage, and applied to the resonance circuit including the detection coil.

* * * * *